United States Patent
Burkhardt et al.

(10) Patent No.: US 10,296,324 B2
(45) Date of Patent: May 21, 2019

(54) ZERO DOWNTIME SOFTWARE SYSTEM UPGRADE

(71) Applicant: SAP SE, Walldorf (DE)

(72) Inventors: Erwin Burkhardt, Walldorf (DE); Martin Hartig, Speyer (DE); Christoph Luettge, Muehltal (DE); Heiko Konrad, Hockenheim (DE); Christian Lutter, Wiesloch (DE); Martin Mayer, Heidelberg (DE); Steffen Meissner, Heidelberg (DE); Matthias Mittelstein, Hamburg (DE); Juergen Specht, Gerabronn (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 90 days.

(21) Appl. No.: 14/929,085

(22) Filed: Oct. 30, 2015

(65) Prior Publication Data
US 2017/0123787 A1   May 4, 2017

(51) Int. Cl.
*G06F 8/656*   (2018.01)
*G06F 8/65*    (2018.01)

(52) U.S. Cl.
CPC .......... *G06F 8/66* (2013.01); *G06F 8/656* (2018.02)

(58) Field of Classification Search
CPC .................................. G06F 8/66; G06F 8/656
USPC .......................................................... 717/170
See application file for complete search history.

(56) References Cited

U.S. PATENT DOCUMENTS

| | | | | |
|---|---|---|---|---|
| 2002/0108077 A1* | 8/2002 | Havekost | ........... | G05B 23/0289 714/47.2 |
| 2003/0143959 A1* | 7/2003 | Harris | ................. | H04W 76/068 455/77 |
| 2005/0278529 A1* | 12/2005 | Kano | ................... | G06F 21/6218 713/168 |
| 2010/0138440 A1* | 6/2010 | Driesen | ............. | G06F 17/30377 707/765 |
| 2010/0211548 A1* | 8/2010 | Ott | ..................... | G06F 17/30575 707/655 |
| 2011/0004850 A1* | 1/2011 | Lodico | .................... | G06Q 30/02 715/838 |
| 2013/0054668 A1* | 2/2013 | Rajan | ........................ | G06F 8/00 709/201 |
| 2014/0142984 A1* | 5/2014 | Wright | .................. | G06F 19/321 705/3 |
| 2014/0230076 A1* | 8/2014 | Micucci | ............ | G06F 17/30861 726/28 |
| 2015/0378766 A1* | 12/2015 | Beveridge | ........... | G06F 9/45558 718/1 |

* cited by examiner

*Primary Examiner* — Li B. Zhen
*Assistant Examiner* — Sen Thong Chen
(74) *Attorney, Agent, or Firm* — Mintz Levin Cohn Ferris Glovsky and Popeo, P.C.

(57) ABSTRACT

A zero downtime upgrade procedure is initiated that upgrades a first version of software executing on a source system comprising at least one source server to a second version of software executing on a target system comprising at least one target server. The source system initially starts operating in a read-write mode. Thereafter, concurrent with the operation of the source system, operation of the target system is initiated in a read-only mode. Operations of the source system are then ceased by ramping down activities of the source system. Upon cessation of operation of the source system, operation of the target system is initiated in a read-write mode.

15 Claims, 17 Drawing Sheets

ZERO DOWNTIME SOFTWARE SYSTEM UPGRADE

TECHNICAL FIELD

The subject matter described herein relates to the upgrade of software systems without interruption.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, zero downtime upgrades. With such arrangements, upgrades run in parallel to a production system within the same database for the complete duration of the upgrade. The procedure creates clones of the tables, which are changed by the upgrade and runs database triggers to replicate data from production to the upgrade copy of the tables. With the maintenance procedure running in parallel with the production system in the same database, the upgrade can no longer be revoked by restoring a backup.

SUMMARY

In one aspect, a zero downtime upgrade procedure is initiated that upgrades a first version of software executing on a source system comprising at least one source server to a second version of software executing on a target system comprising at least one target server. The source system initially starts operating in a read-write mode. Thereafter, concurrent with the operation of the source system, operation of the target system is initiated in a read-only mode. Operation of the source system are then ceased by ramping down activities of the source system. Upon cessation of operation of the source system, operation of the target system is initiated in a read-write mode.

The ramping down of activities can include one or more of (i) switching off asynchronous processing and switching on synchronous processing, (ii) preventing batch jobs having an execution time above a pre-defined switchover threshold from executing on the source system, or (iii) logging out users of the source system having an idle time above a pre-defined idle time threshold.

The initiating of the target system can include installing software for the second version on the target system, preventing access to the target system, configuring the target system to operate in a read-only mode, and starting the target system in the read-only mode.

Login to the source system can be disabled after the target system is started and opened for login.

As part of the switchover, any remaining batches at the source system can be terminated.

After the cessation, the source system can be updated to include the second version of the software which enables the source system to operate using the second version of the software.

The source system and the target system can share a set of database tables on which both the source system and the target system can perform read-write operations.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter allows for upgrades that avoid significant downtimes which can, in some cases, require several hours depending on the complexity and breadth of the underlying system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter enables zero downtime maintenance/upgrade procedure that allows for switching of software kernels being executed on a plurality of servers without user interruption.

Figure 1:
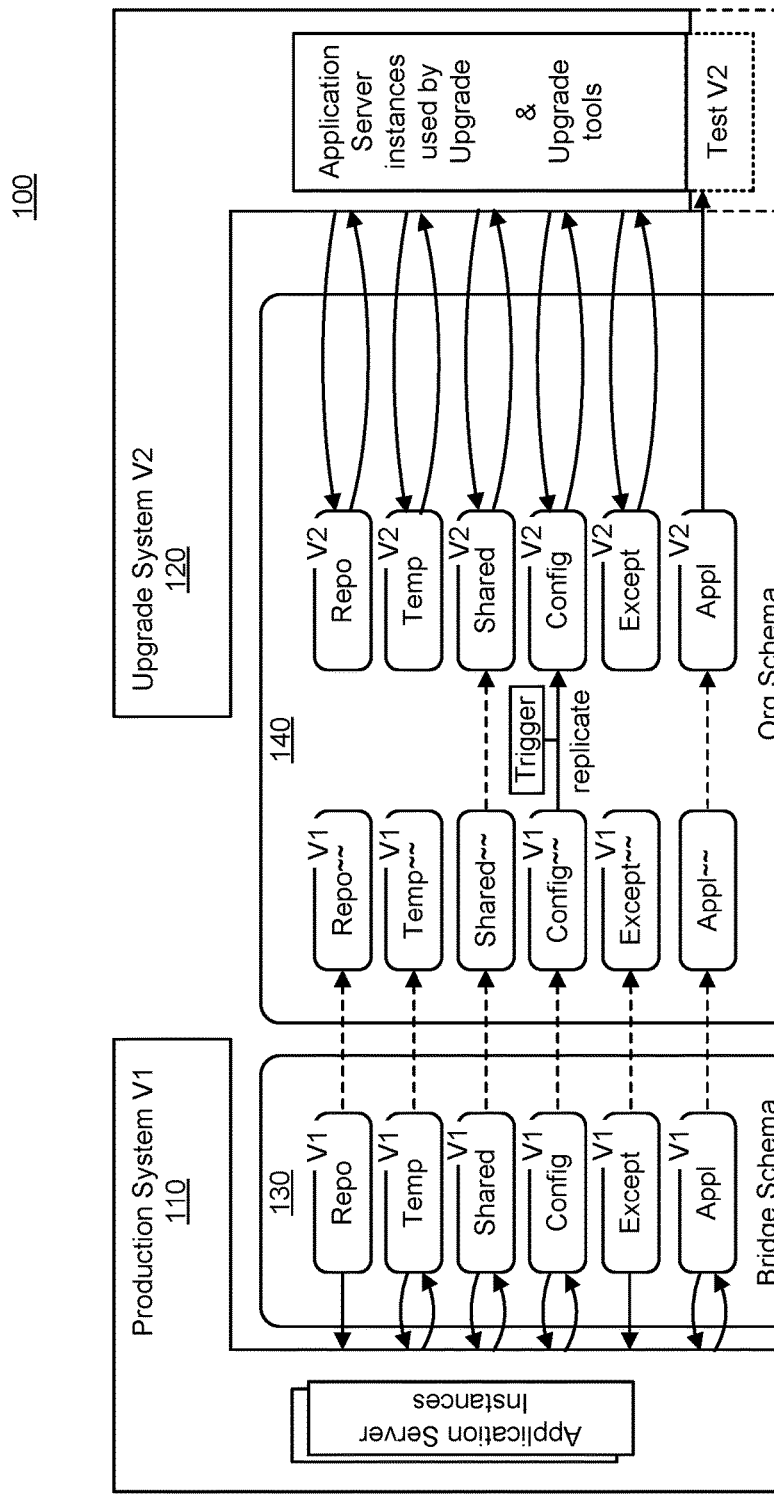
FIG. 1 is a first diagram illustrating a zero downtime upgrade procedure.

FIG. 1 is a diagram 100 illustrating a process of a zero downtime upgrade of a production system 110 (sometimes referred to as a source system) to an upgrade system 120 (sometimes referred to as a target system). The production system 110 runs various application server instances executing a first version of software (as indicated by the designation V1) and the upgrade system 120, when upgraded, runs various application server instances running a second version of software (as indicated by the designation V2). As part of a zero-downtime upgrade from the production system 110 to the upgrade system 120, a bridge schema 130 provides various tables of data that are in turn used by an original schema 140 to generate/populate alias tables that, in turn, are used to generate tables that are ultimately used by the upgrade system 120. In some cases, the upgrade system 120 can be tested prior to going live. Further details are provided below.

Figure 2:
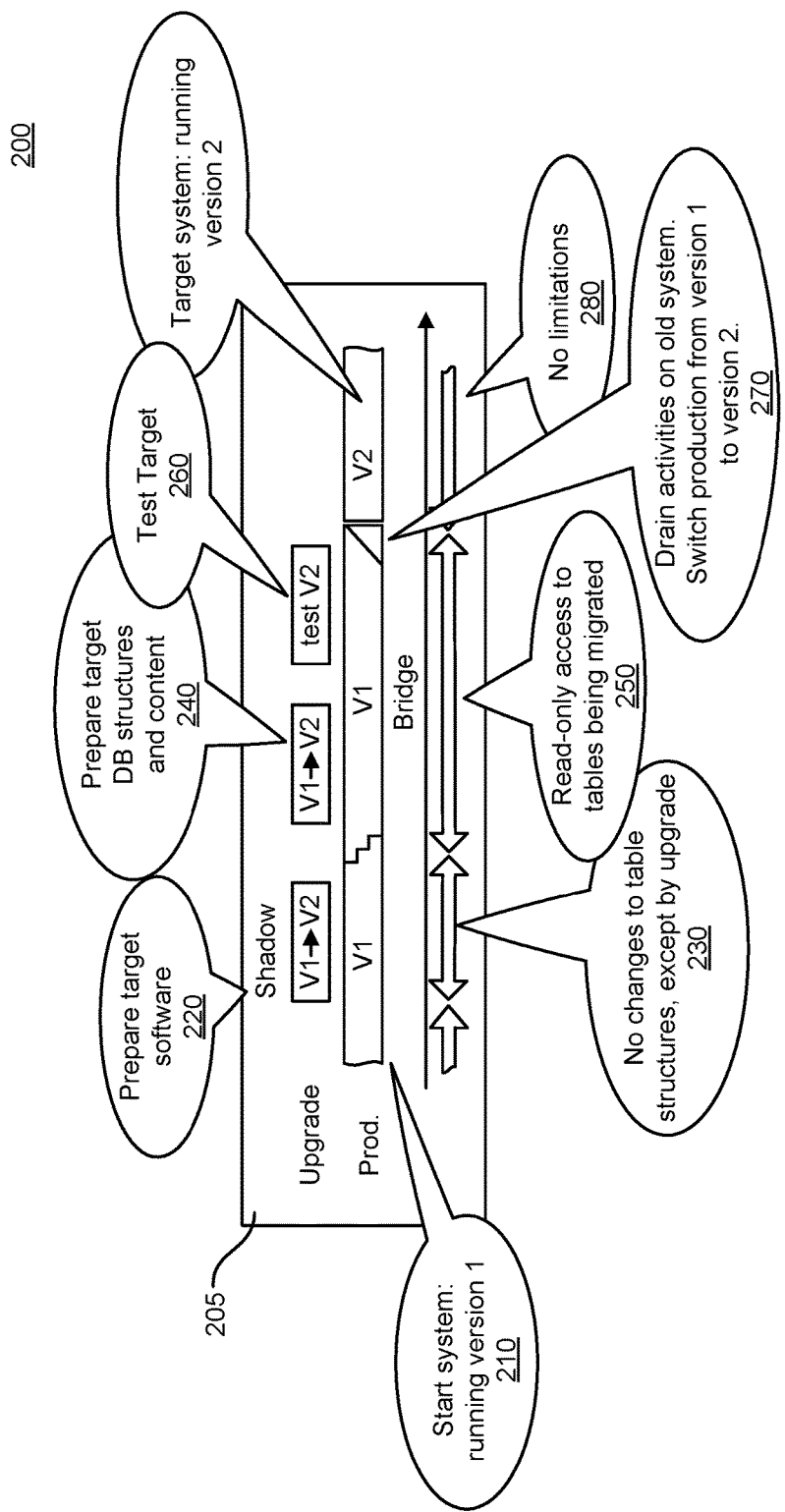
FIG. 2 is a first diagram illustrating a zero downtime upgrade procedure.
Figure 3:
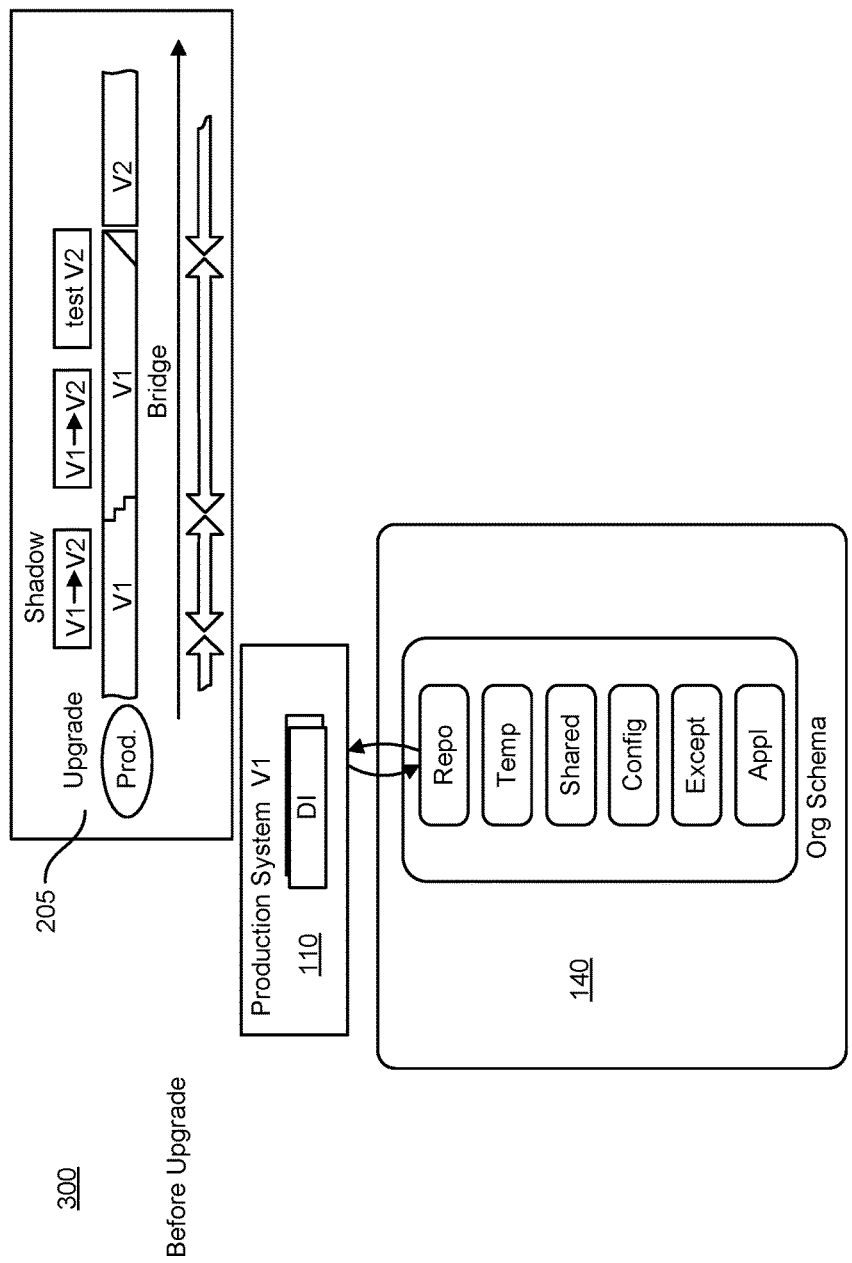
FIGS. 3-12 are diagrams providing a sequence of a zero downtime upgrade procedure.

FIG. 2 is a diagram 200 providing an overview of a zero downtime upgrade process moving from version 1 (V1) software on a production system to version 2 (V2) software on the target system. With reference to the legend 205, at 210, the production system is initially running version 1 software. Subsequently, at 220, target software including (shadow tables) is prepared. No changes are made, at 230, to table structures except where upgrades require changes. Thereafter, at 240, target database structures and content are prepared. During such time, at 250, the tables being migrated are only accessible via read-only access. Prior to deployment, at 260, the target software can be tested. If the testing is successful, at 270, production is switched from version 1 to version 2 and, at 280, activities are drained/ceased on the old production system.

Stated differently, a zero downtime maintenance procedure can work by first generating upgrade scripts. Thereafter, revoke scripts can be generated. Next, the application upgrade package can be analyzed so that it can be derived which tables get content by the upgrade package, are changed in structure by the upgrade package (so that such tables can be categorized based on their treatment in the upgrade). In addition, the target software (i.e., the upgraded software) can be prepared in parallel to production use. The target database tables are also prepared. In case the table gets content, it is cloned: a copy can be created including all content and one or more triggers ensure the content remains up-to-date to changes. In cases in which a table's content is migrated, a copy of the table is created and the original table can be designated as read-only and a migration report can be run. Thereafter, the upgraded content is deployed to the cloned tables. After the target version is tested and confirmed to be working properly, users can be switched to the target version.

The tables in the database can be classified into various categories. First, there are the Config tables that receive the content for the upgrade. The Config tables can be cloned by creating a copy of the table and having a database trigger replicate all data from the table used by production to the table used by the upgrade to deploy new data. The table used by production is consistent in structure and content with respect to the start release. Furthermore, upon the switch of production to target version, the production is configured to use also the target table.

Another type of table does not receive content for the upgrade but their structure is adjusted (e.g., new fields are added, etc.). The access by production to such tables can be redirected to a projection view on the table. The view can include the same fields of the table's structure as of the start release version. Subsequently, these tables can be extended on the database level through the addition of new fields. The production can access this extended table There can additionally be tables that are not touched by the upgrade. That is, neither the structure nor the content of such tables are changed. With such tables, locks can be set, either for the complete table or for single rows.

Another type of table can be referred to as an Except table. With these tables, other types of changes are made that can be put to read-only for the bridge. For example, if a field is elongated, the table is then part of the Except category. These tables can be set to read-only for the production. A table with a different name can be created, but with the tables target structure. Thereafter, a batch job can be run, which transfers all data from the original table to the target table. Upon the switch of production to target version, the production can be configured to also use also target table.

Figure 4:
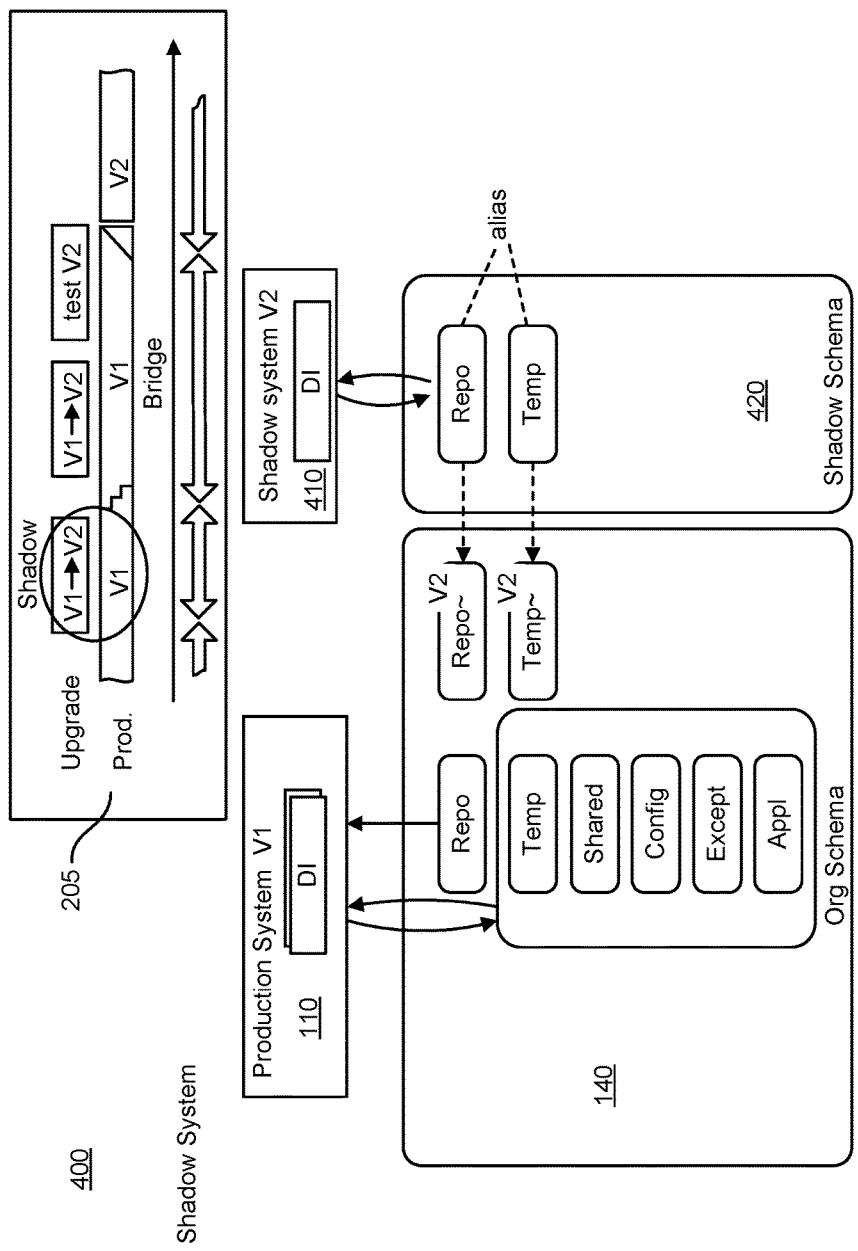

FIGS. 3-12 provide an overview zero downtime upgrade procedure. With reference to diagram 300 of FIG. 3, before the upgrade, user can use a dialog instance connected to a standard schema. Diagram 400 of FIG. 4 illustrates an uptime and shadow system period in which preparation checks are run. Maintenance mode is switched on (no changes to table structures except by upgrade). In addition, a shadow system 410 with shadow schema 420 is set up, the target software is deployed to tables "Repo~" and the target structures of the tables are computed. The shadow system is a mechanism to prepare the content in the shadow tables named TABLE~, e.g. for the repository content stored in Repo~. Details regarding the use of a shadow system can be found in U.S. Pat. No. 7,523,142 entitled: "Systems, methods and articles of manufacture for upgrading a database with a shadow system", the contents of which are hereby fully incorporated by reference. Changes brought by the upgrade can be analyzed to determine which tables for migration are to be cloned later. In addition, the content brought by the upgrade can be analyzed to determine which tables to later clone.

Figure 5:
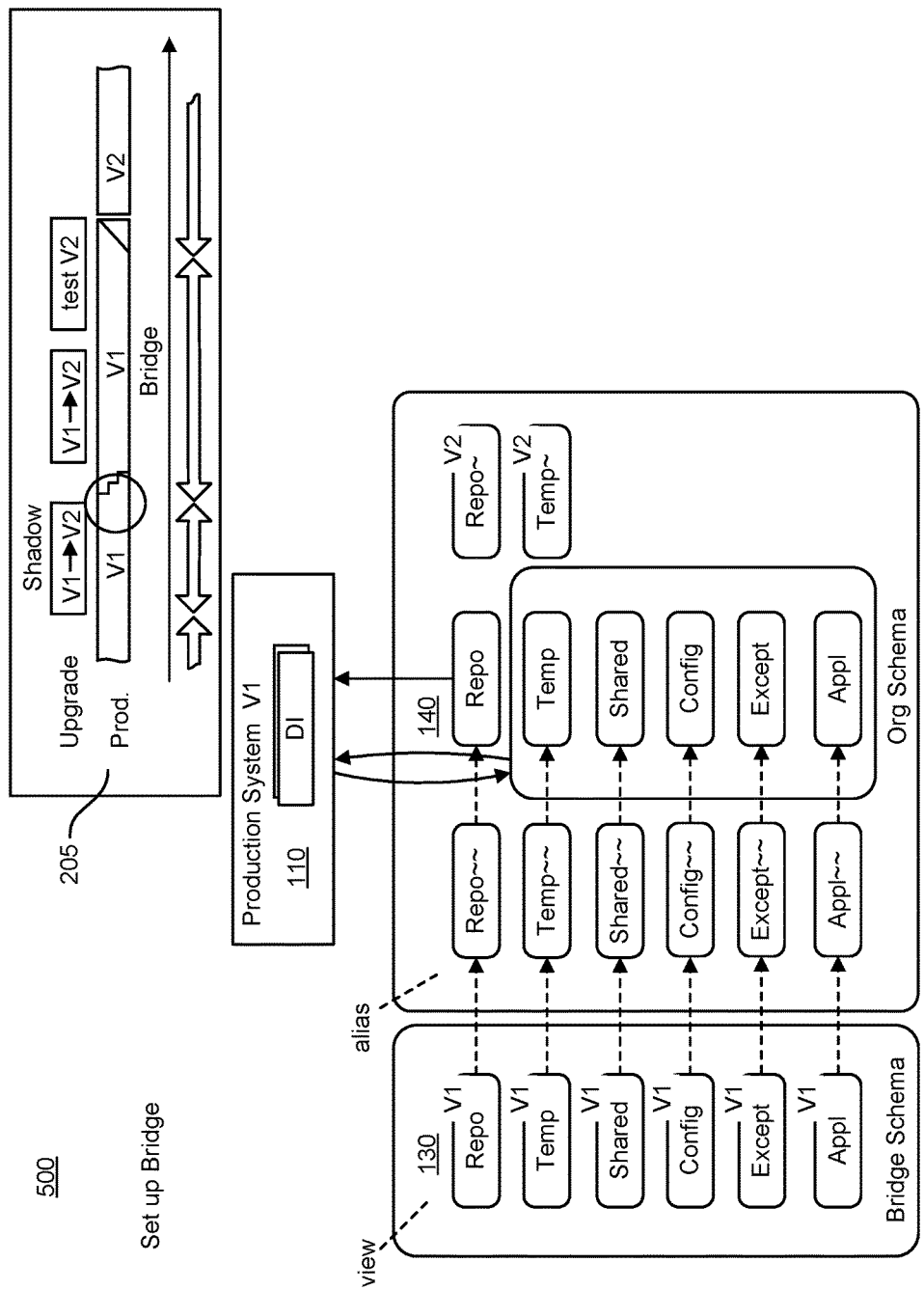

With reference to diagram 500 of FIG. 5, an alias "TABLE~~" for all tables "TABLE" is created. In addition, a second database schema "bridge schema" 130 can be created and in there a view "TABLE" for all aliases in the original schema "TABLE~~".

Figure 6:
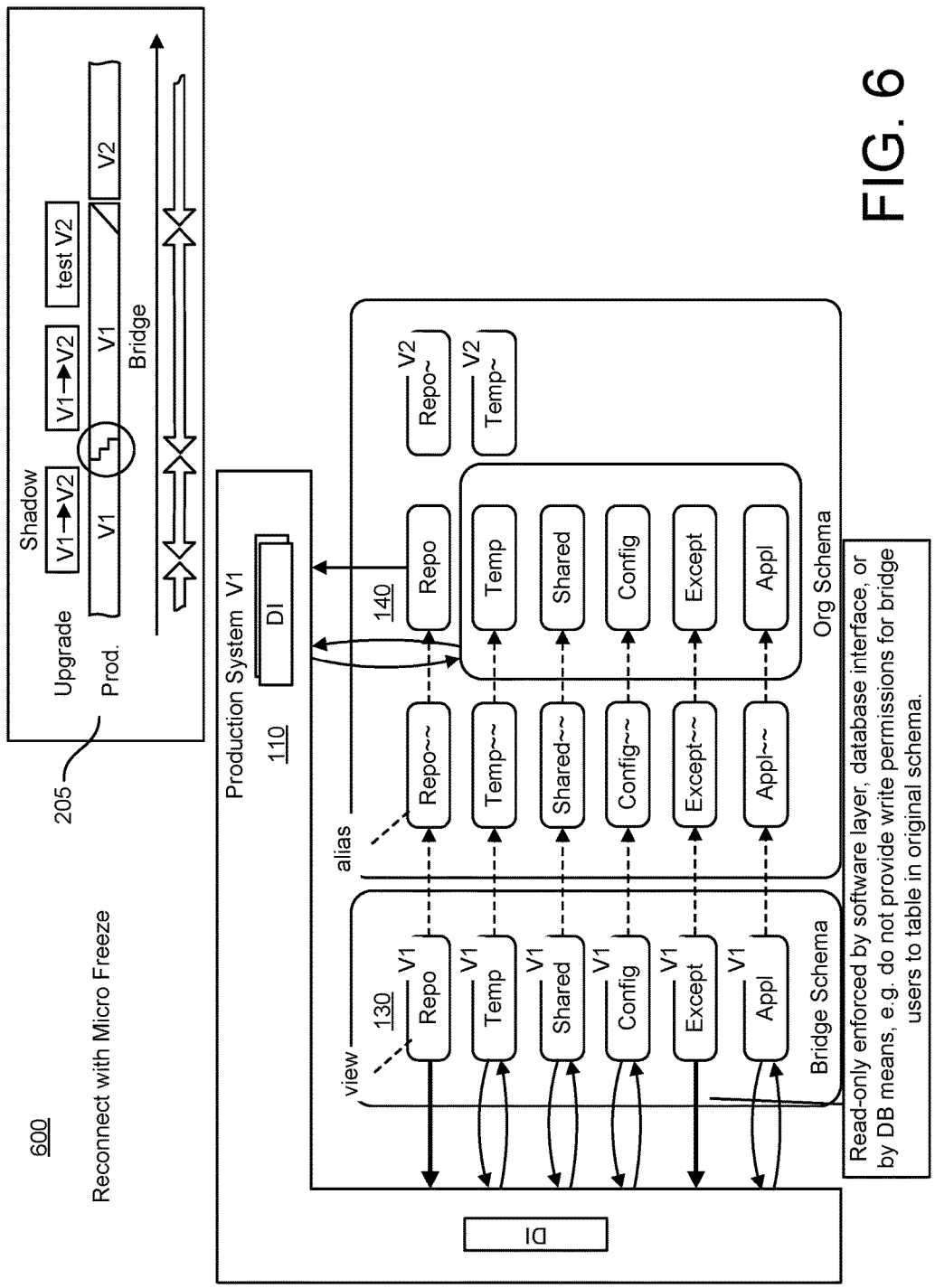

With reference to diagram 600 of FIG. 6, dialog instances can be reconnected from the original schema 140 to the bridge schema 130. The dialog instances "suspend" all actions by users, disconnect from the DB original schema 140 and connect to bridge schema 130. Further, as part of a bridge operation period, production runs on the production system 110 connected to the bridge schema and tables, which will be migrated later, are designated as read-only.

Figure 7:
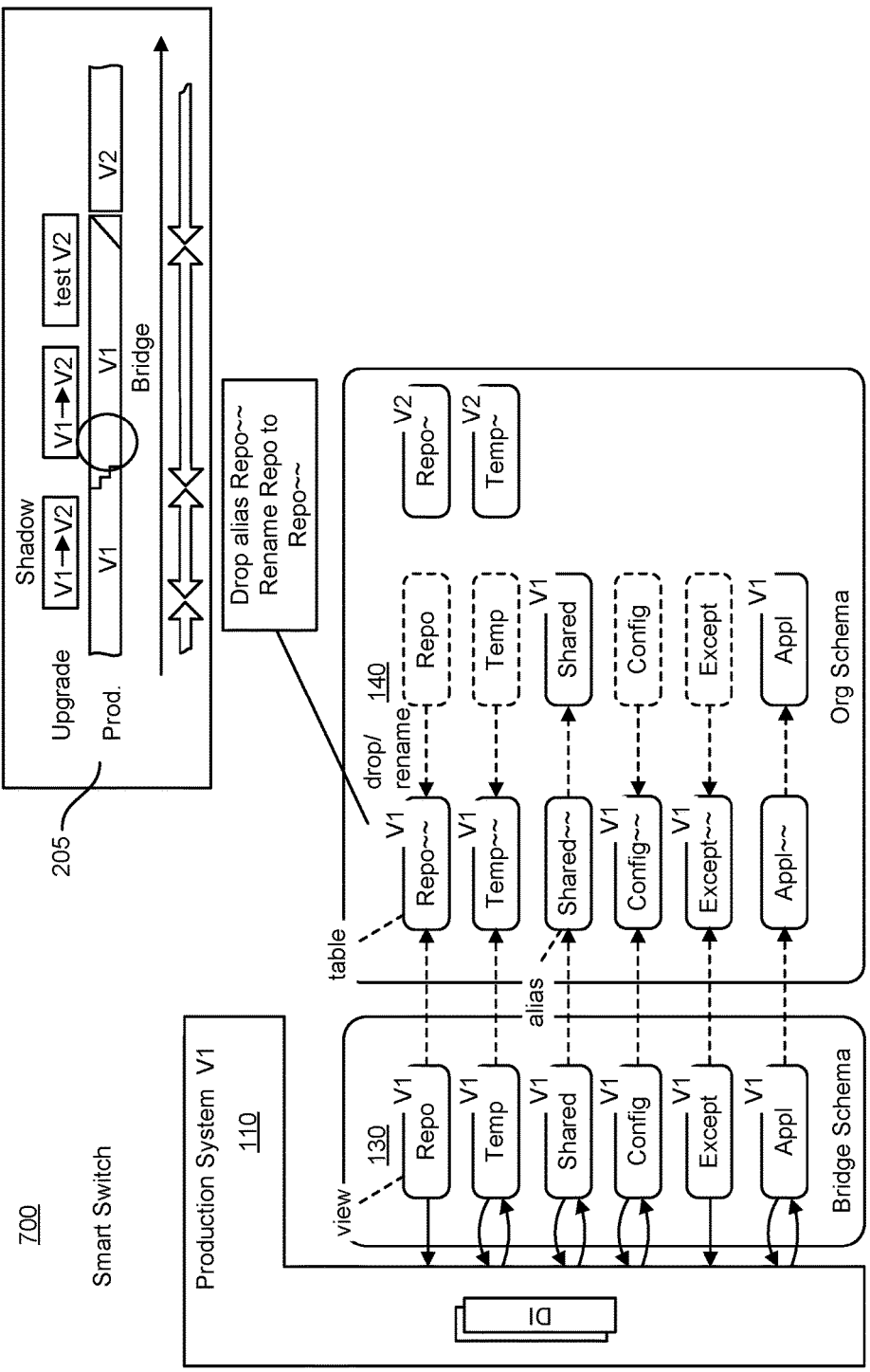

With reference to diagram 700 of FIG. 7, for a smart switch, for those tables that are switched from shadow ("Repo", "Temp") or cloned later, ("Config", "Except"), a smart switch is run. The smart switch causes the alias "Repo~~" to be dropped and the table "Repo" to be renamed to "Repo~~".

Figure 8:
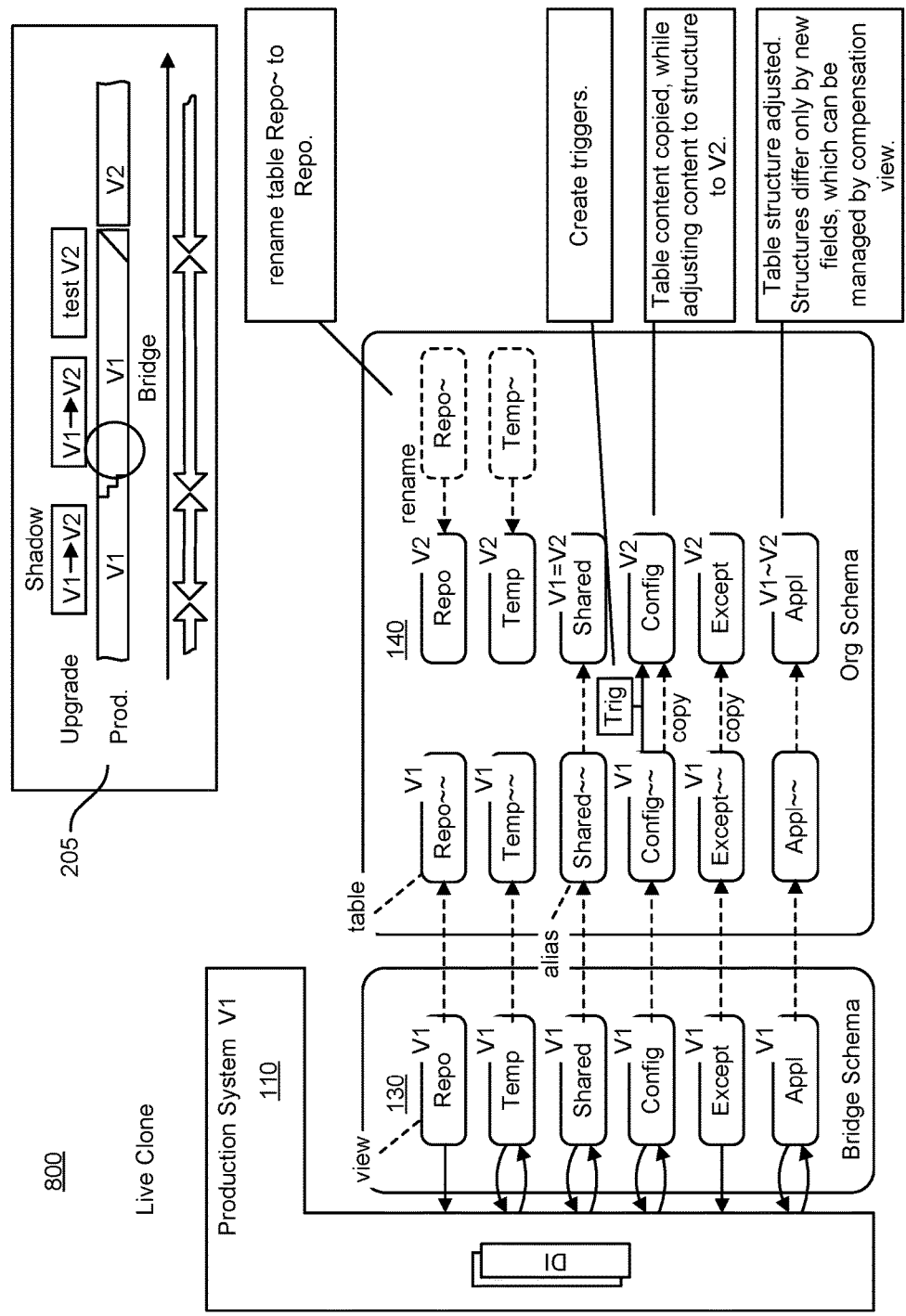

With reference to diagram 800 of FIG. 8 the shadow tables are renamed ("Repo~", "Temp~"). "Config" and "Except" are created as new tables with the target structure"). As part of a live clone process the unchanged data is copied from Config~~ to Config and additionally triggers are created for the "Config~~" tables, which transfers all changes done by production to Config~~ to Config. The tables, which are shared ("Share" and "Appl") are adjusted structure-wise. New fields can be added (with more complex structure change resulting in the table being in category "Except").

Figure 9:
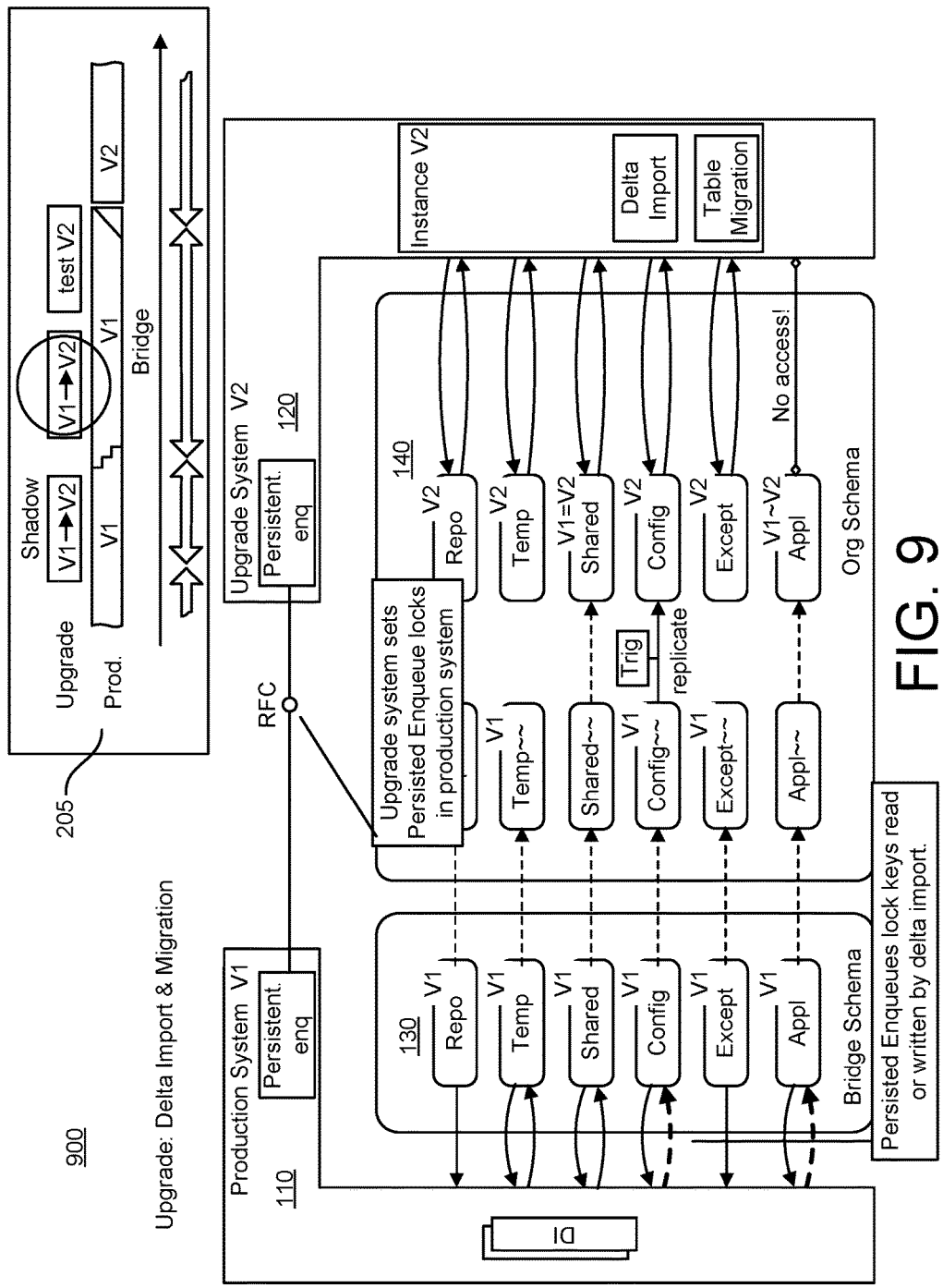

With reference to diagram 900 of FIG. 9, as part of delta import and table migration, the content brought by the upgrade is deployed to the config tables. The import of content can also be done by programs running in the upgrade system 120. The tools create persistent enqueue locks in the production system for changed rows where the production shall not change content any mode. For other changes, where production and upgrade change the same rows, the changes are not replicated, the upgrade wins.

Figure 10:
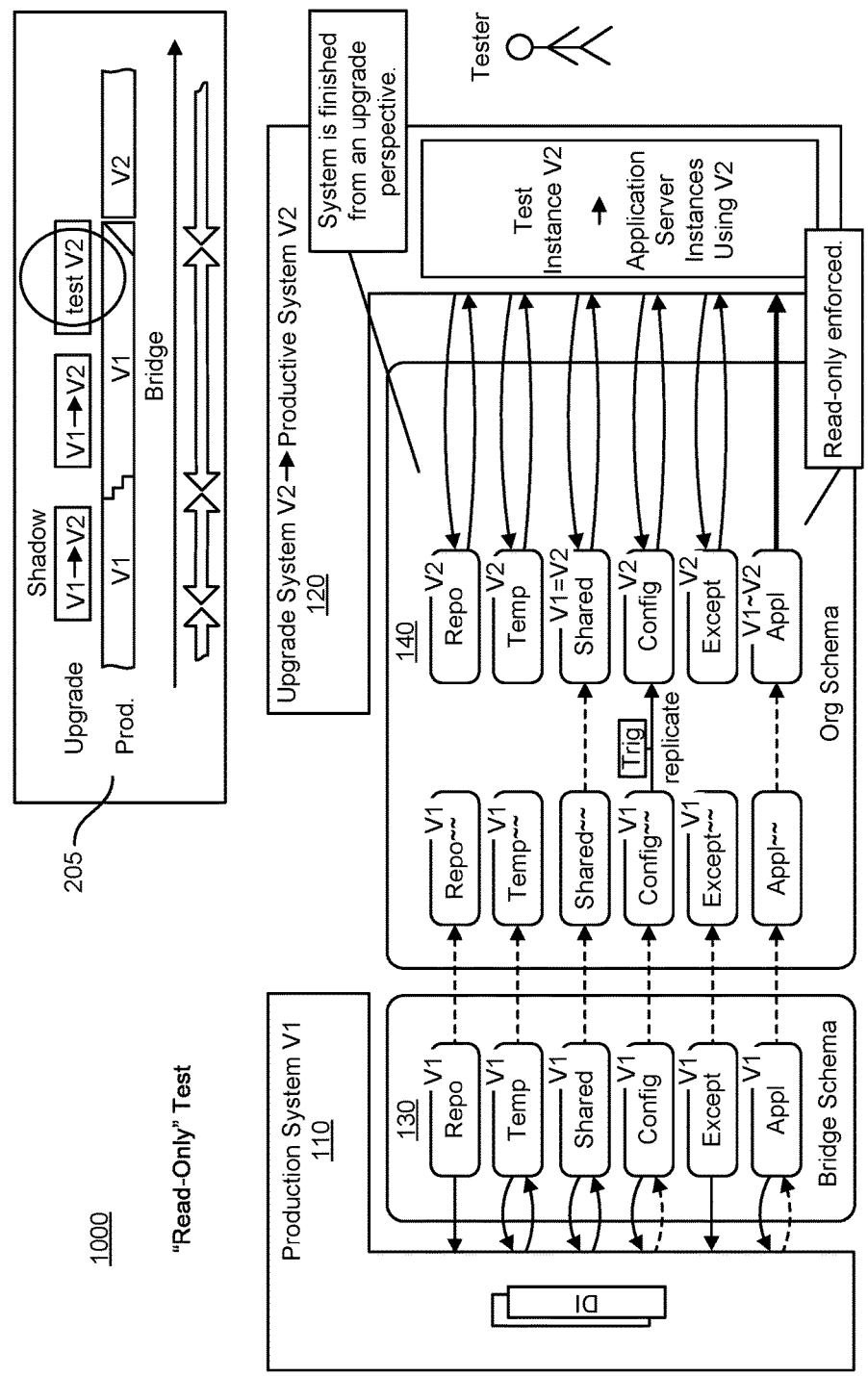
Figure 10A:
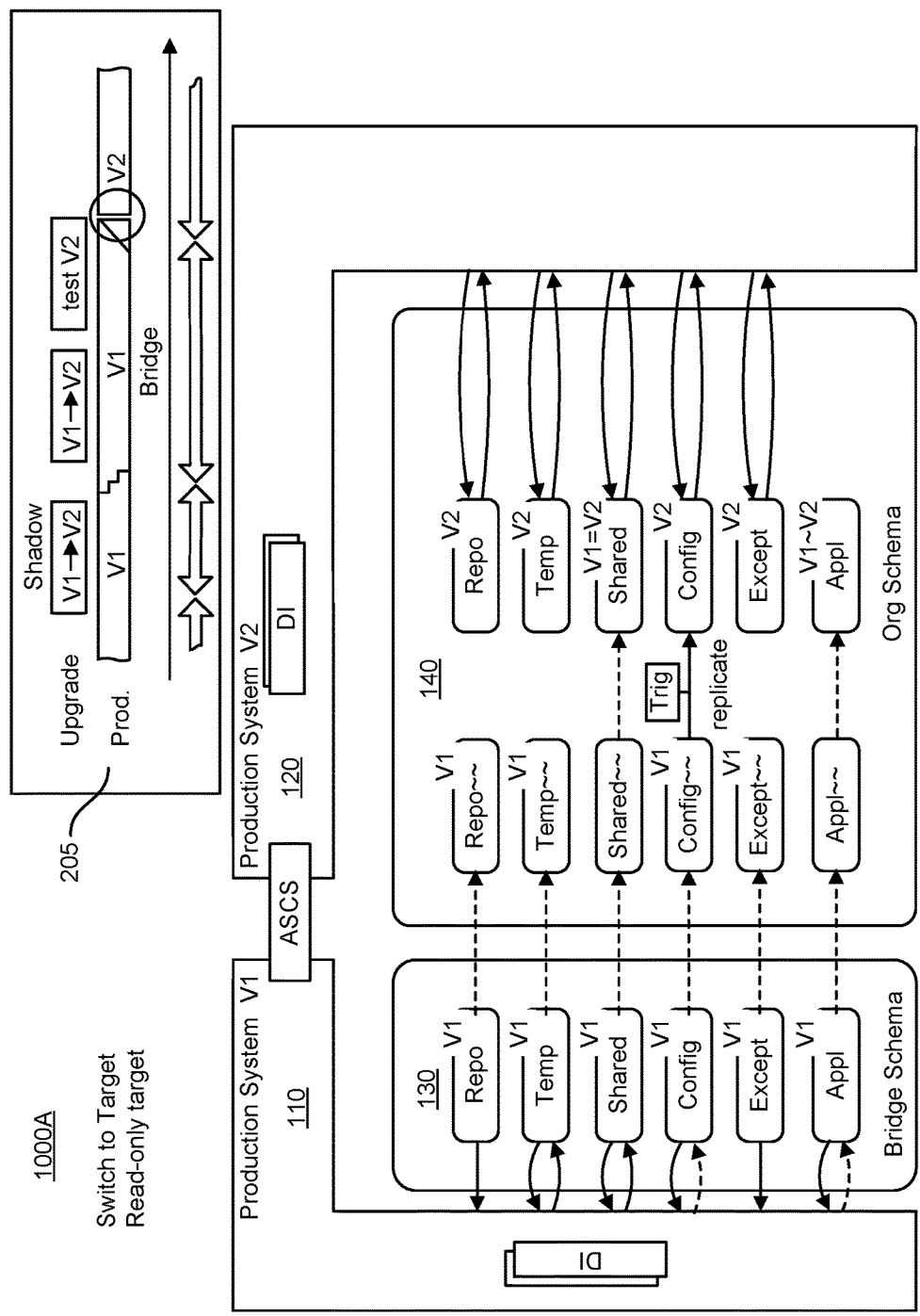

With reference to diagram 1000 of FIG. 10, for read-only tests, the application tables are equipped with freeze triggers. These triggers ensure no content changes can be done by the database user of the original schema 140 for the application tables. For example, upon a write or update attempt, the freeze trigger returns an error code and potentially written data in the open transaction is rolled back by the database. The user of the bridge schema 130 can still change content. In addition, the dialog instances of the upgrade are started and opened for test users. Further, users can read all data, they can write data of category "Repo", "Config", "Share", "Temp" and "Exception". Application data cannot be changed. Once the read-only upgrade tests have been finished successfully, as illustrated in FIG. 1000A of FIG. 10A, the upgrade system is stopped and replaced with the new productive system V2 with some early instances. These will be opened for all users. These users can logon and search, investigate and select data. But application data cannot be changed in this phase, that will be allowed later.

Figure 11:
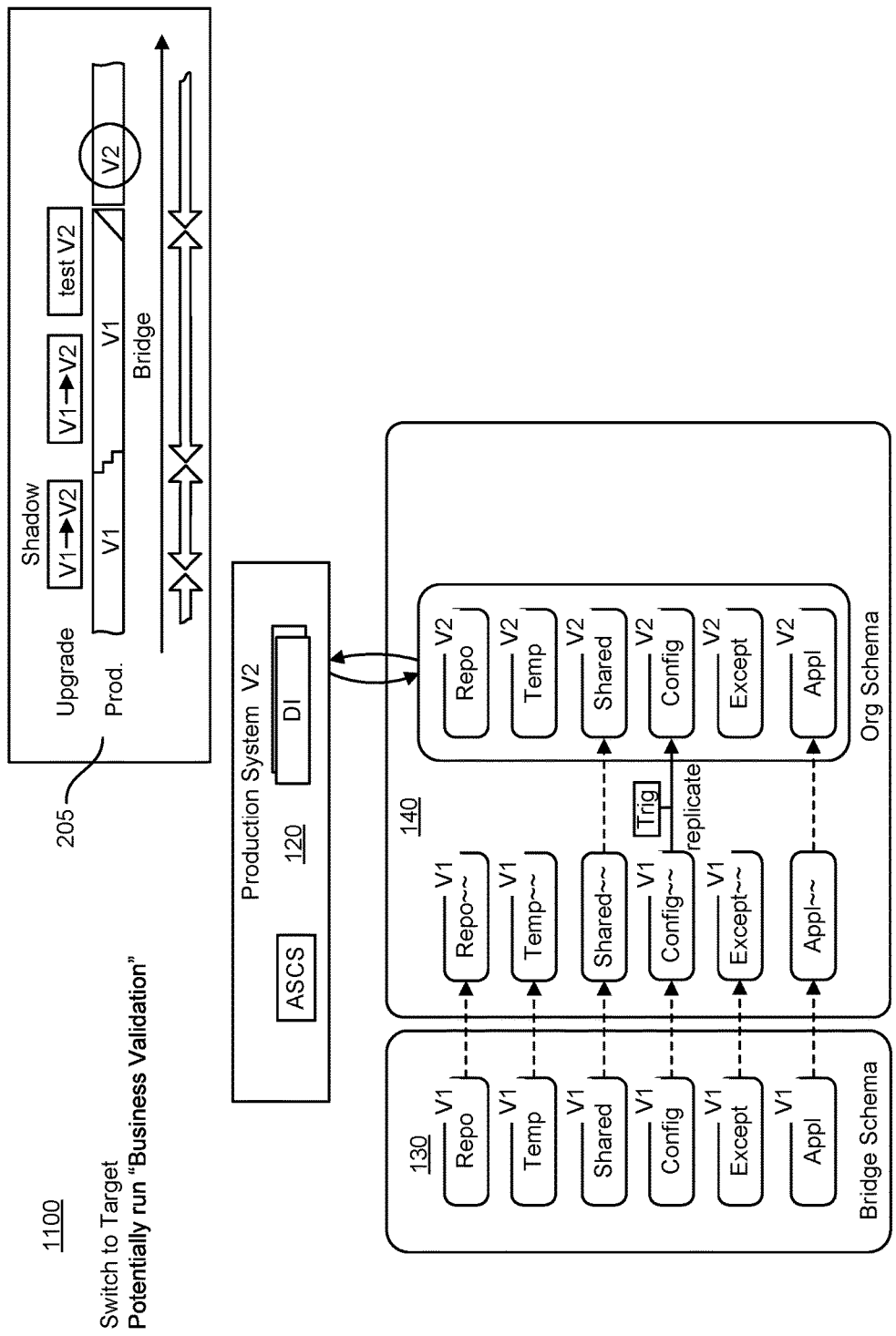

With reference to diagram 1100 of FIG. 11, users of the production system 120 (running V2) can be switched from bridge schema 130 to the original schema 140. Batches on V1 110 are phased out, users on production system 110 are logged off, and queues stored in bridge schema 130 are run until they become empty.

Figure 12:
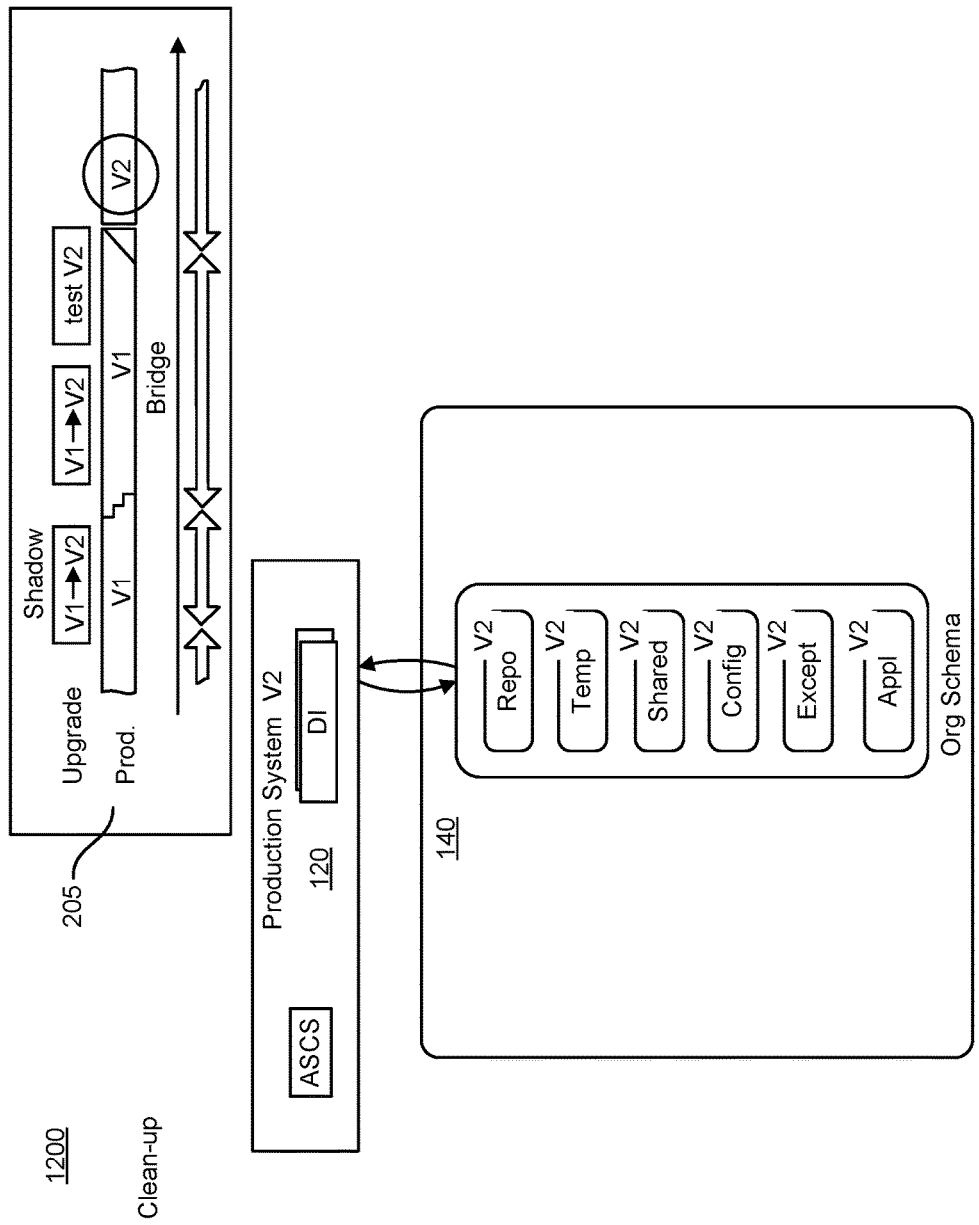

With reference to diagram 1200 of FIG. 12, the target system (production system 120) is next opened for all users. In addition, upgrade artifacts can be cleaned up.

Figure 13:
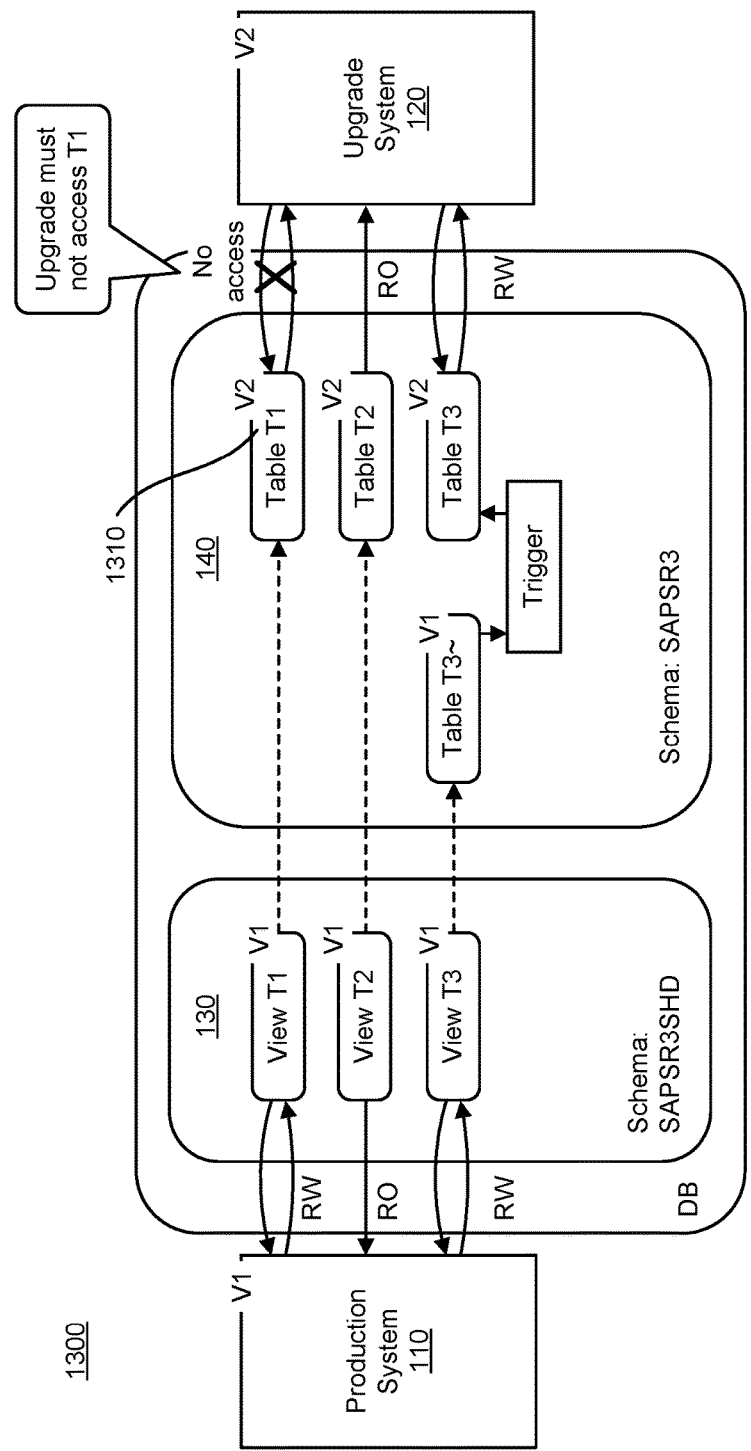
FIG. 13 is a diagram illustrating table access during a zero downtime upgrade procedure.

With reference to diagram 1300 of FIG. 13 an upgrade of production system 110 to upgrade system 120 is shown. A bridge schema 130 is used for an interaction with an original schema 140 as part of a software update to upgrade system 120 (which will run version 2 of the software once upgraded). As part of the upgrade procedure, Table T1 1310 should not be accessed during the upgrade.

Figure 14:
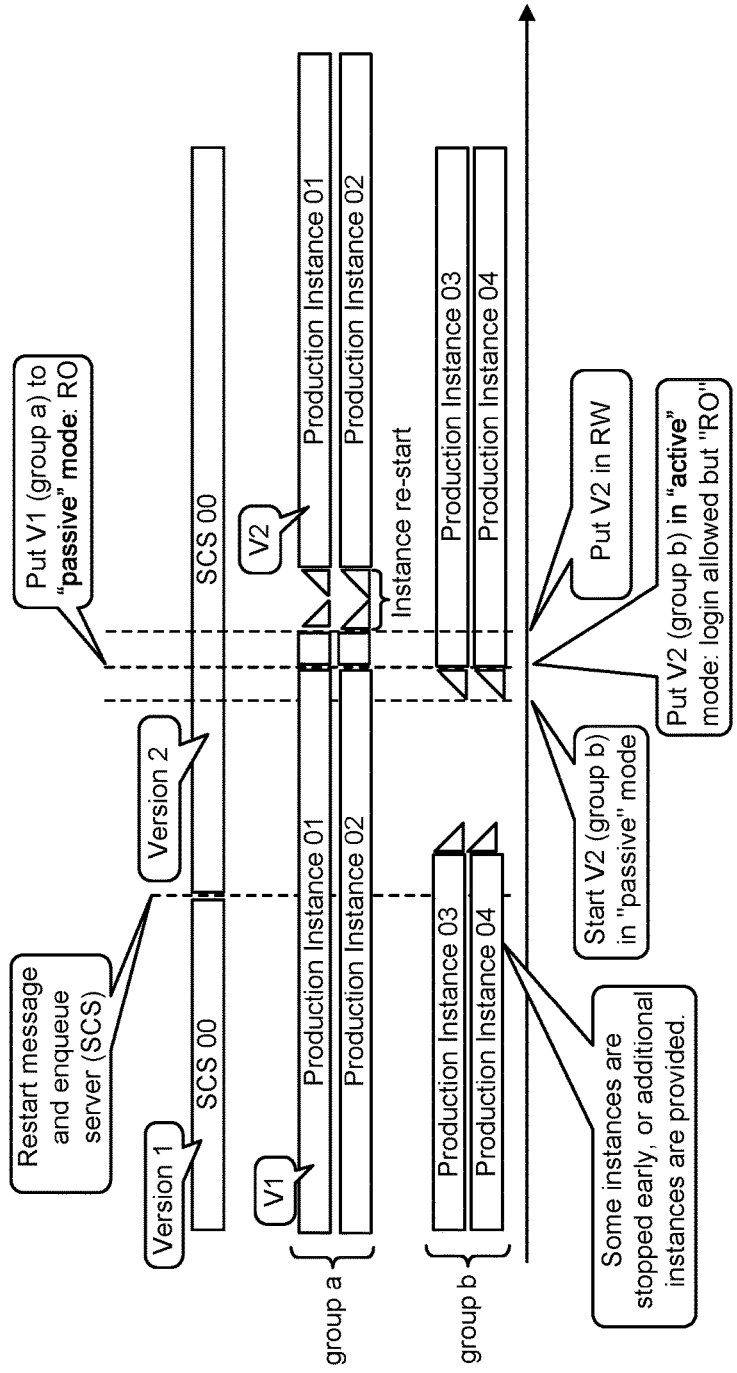
FIG. 14 is a first diagram illustrating aspects of a zero downtime upgrade procedure.

FIG. 14 is a diagram 1400 that illustrations how a zero downtime upgrade can operate such that there are two versions of applications servers that are run in parallel. In particular, the current subject matter provides a target release runtime environment concurrently with the start release runtime environment while it is still in use so that usage (especially write actions) can be switched from the start release runtime environment to the target release very quickly.

To run the target release application server instance and the start release application server instance in parallel three abilities can be provided as follows. The application server instances can have their own OS (operating system) file system and their own executables. The executables of the application server can then be updated to the target release instance individually for every instance. Second, two groups of instances can be defined: those that serve the start release requests until the last commit is complete (group a) and those, which are started early with the target release software (group b), in which users can already log in and execute read operations.

The message server and enqueue server (SCS 00) are handled separately. In a first step their executables are replaced with version V2 and the processes are restarted with these new executables. There is a hand-over mechanism for existing connections and existing locks and that is very fast. For a while the message server and the application server are responsible for the old V1 instances and for the fresh instances of the productive system V2. Starting an additional message server here would mean that all external requests have to learn how and when to switch to the new one. This arrangement implies that the communication protocol used by the message server and enqueue server stay compatible and the old version application server instances can operate with a new version of both.

To enable the application server instances to run with the target release software and standard database connects already during a phase, where production business processes are still in service with the start release application server instances with the zero downtime database connect requires that one can write to a set of tables with both software versions in parallel (e.g. the user management, where "last login time" etc. are stored). Therefore, there is a set of tables in which parallel use of two versions of software executing on different application servers is enabled.

Most other tables are not enabled to be used concurrently by two versions of application servers. Write locks are set up to ensure, that for those tables either the old application servers (V1) or the new application servers (V2) can write. These limitations can be provided by freeze triggers that can be configured to allow write access either by a zero downtime database connect or by standard database connects. Their configuration can be changed by setting one entry in a database table, thereby making the switchover very fast.

The freeze triggers can deliver an abort message for the end user, in case a commit is submitted for tables which are blocked. The freeze trigger can identify, through which server group the write request is sent. Write requests sent by the server group on start release are allowed and write requests sent by the server group on the target release are blocked. A mechanism can provide for disabling editing objects in addition to blocking the commit by a feature in the enqueue mechanism. Typically, application transactions request an enqueue lock for an object they want to change. This ensures, only one user a time can edit an object. The enqueue mechanism can be configured to not give locks in the target release application server instances until it is desired to enable write operations. This way, the user cannot implement changes as it is told that the upgrade holds a lock on the object. The change by that the edit operation is already disabled and not only on the final commit, this form of disabling change is more user friendly, as the user is informed about the read-only mode earlier, before the change is even entered. The enqueue mechanism can also be switched to give locks by a configuration parameter which is also very fast.

Switching, as provided herein, enables an arrangement in which users can already login to the target release and perform read-only activities while final activities are still run on the start release. For data that must be written even during the read-only phase, e.g. the user login time, persistencies can be enabled for parallel write operation by both versions.

The current subject matter not only minimizes impact on users as part of a switchover from the start release to the target release, the current subject matter also minimizing the number of running actions that are aborted. Running actions are only aborted to speed up the switch over as it is undesirable to block operations for a large number of users due to only one user not finishing its transaction. Typically, the users and also remote systems can deal with an abort by redoing the action or call provided that the action is consistently aborted such that the database transaction is rolled back.

Batch planning can be utilized to selectively start only those batch jobs before switchover time which will finish in time. A batch system can collect runtime statistics data and compute a median value for batch jobs, when most job runs had been finished. This value can be used to predict which job will run for how long. Batch jobs required to run to process queue entries for queues which need to be empty on the start release at the last shut down are still scheduled.

An admin or upgrade tool can be used to define the point in time when the switch over is executed. Based on this point in time, the batch system can be configured to no longer start batches which have a runtime of more than ~80% of the remaining time to the switch over. Further, in some variations, batches, which are not finished at the switchover time can be terminated. These batch jobs need to be restarted on the target release. The impact on the batch operation should be minimal this way, the number of batch jobs which are terminated are minimized.

The current subject matter can also take into account asynchronous activities (e.g., "update task", "processing of queues" for LIS, BW, qRFC, bgRF, etc.) which can be utilized to speed up operations. The expense in the context of a switchover is that these tasks typically have to be completed before the switchover to the new version, as it is not guaranteed that the content can be processed on the target release. These tasks can be handled by identifying (a) which of the tasks include asynchronous processing that can be switched to synchronous processing, even at the expense of slower response time and (b) the content compatible in the sense, that the content can be processed on the target release. The asynchronous tasks are distributed by message server to a free process, this distributing of tasks takes place only within the server groups either on the start release or on the target release. A asynchronous task triggered on the start release is executed on the start release and an asynchronous activity triggered on the target release is executed on the target release. The queue content written on the start release may be processed on the target release, if the content is compatible and the target software can manage content written by the start release.

The system can be configured to run asynchronous processing with external systems using a mechanism which can manage different versions. Next, queues in which content can be processed on the target version are specified so that they need not to be empty on the start release at shut down time. Some minutes before the switchover, synchronous processing can be turned on. The system can become somewhat slower for the remaining time. In this status of the system, remaining user and batch activities can be terminated, transactions rolled back, and entries in queues do not need to be processed. After terminating user sessions, the system can be immediately stopped.

To minimize system load and to also reduce the number of users in the system, an auto logout idle time can be used that is, for example, set to 60 seconds during the squeeze out time, users not executing any actions are logged off after the idle time is passed. If the users want to continue work, initially, they will be logged in again on the start release. Once the switchover has already started the target release for read-only operation, users logging on again are logged in to the target release. Later during the switchover, the auto logout time can be set to, for example, 10 seconds. Users with no action in the system for 10 seconds can be logged off. If they re-login during the switchover time, the login can be redirected to the target release.

Some database operations can be run on both versions in parallel. The enqueue server can be configured to allow locking of certain business objects (a "white list") and the freeze triggers can be disabled for the corresponding tables written by the application. Database tables are open for write by the start and the target release in parallel.

Figure 15:
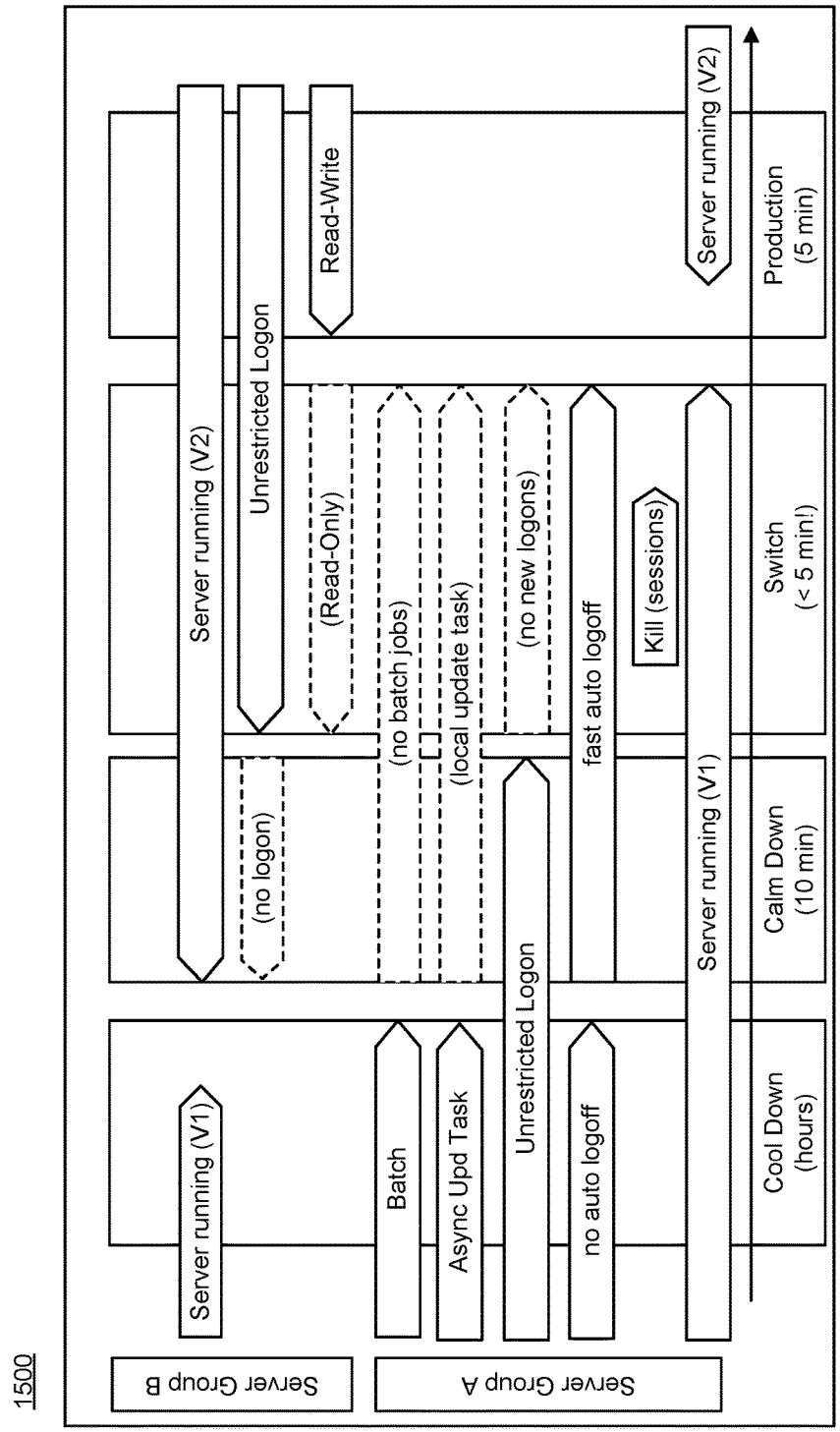
FIG. 15 is a second diagram illustrating aspects of a zero downtime upgrade procedure.

With reference again to FIGS. 14 and 15, there can be three phases: prepare, upgrade, and switchover. During the prepare phase, the user can be asked or otherwise supply the point in time for the switchover and enter the parameter into a downtime planning table. This table can be used by the batch system to manage long running batches using the statistics system described above. In addition, the user can be asked/prompted to switch from asynchronous processes which cannot handle version change to those which can handle version changes. The user can be prompted to define a server group "a" and "b", with "a" being the servers running with version 1 until all requests are processed, and "b" being the group started early on version 2. In case new hosts for application instances are available they can share the role of early production instance on version 2 with the existing instances in group "b".

The upgrade phase can be run until all upgrades are completed, and then, the dialog for the admin, that the switch over will now be executed. The switch over is now no longer done purely on admin trigger, but, when the switch over time has been defined. The group "b" servers can then be stopped if they are used on the start release and are not new hosts. This cessation may require a soft shutdown and potentially batch planning as for the shutdown of the group a later.

As part of the switchover, with server group "a", asynchronous processing can be switched off and synchronous processing can be switched on. The idle user auto logout can be set to a predefined time period such as sixty seconds. Server group "b" can then be prepared by installing new kernel software, removing server group "b" from the message server so that it does not show up in logon groups (so users cannot login), configuring server group "b" to be in "read-only" mode, and then starting the group "b" servers.

Once the group "b" servers are started, login can be switched such that login to the group "a" servers is disabled (i.e., the servers are no longer available in the logon groups, etc.) and the login to the group "b" servers are then enabled.

Subsequently, server group "a" can be shut down. Other measures can be implemented such as changing the idle auto logout time (e.g., to 10 seconds), remaining batches can be terminated, a pause can be used (e.g., 1 minute), and then remaining user sessions can be terminated and any remaining transactions can be rolled back.

Server group "b" can then enable operations by switch to a read-write mode of operation. At this point, the enqueue server can give locks, the freeze triggers can allow commits, and batches can be enabled.

Server group "a" can then be restarted by: first stopping the servers of server group "a", the kernel is updated to reflect the new software, profile parameters are updated, and the servers of server group "a" can be started.

Figure 16:
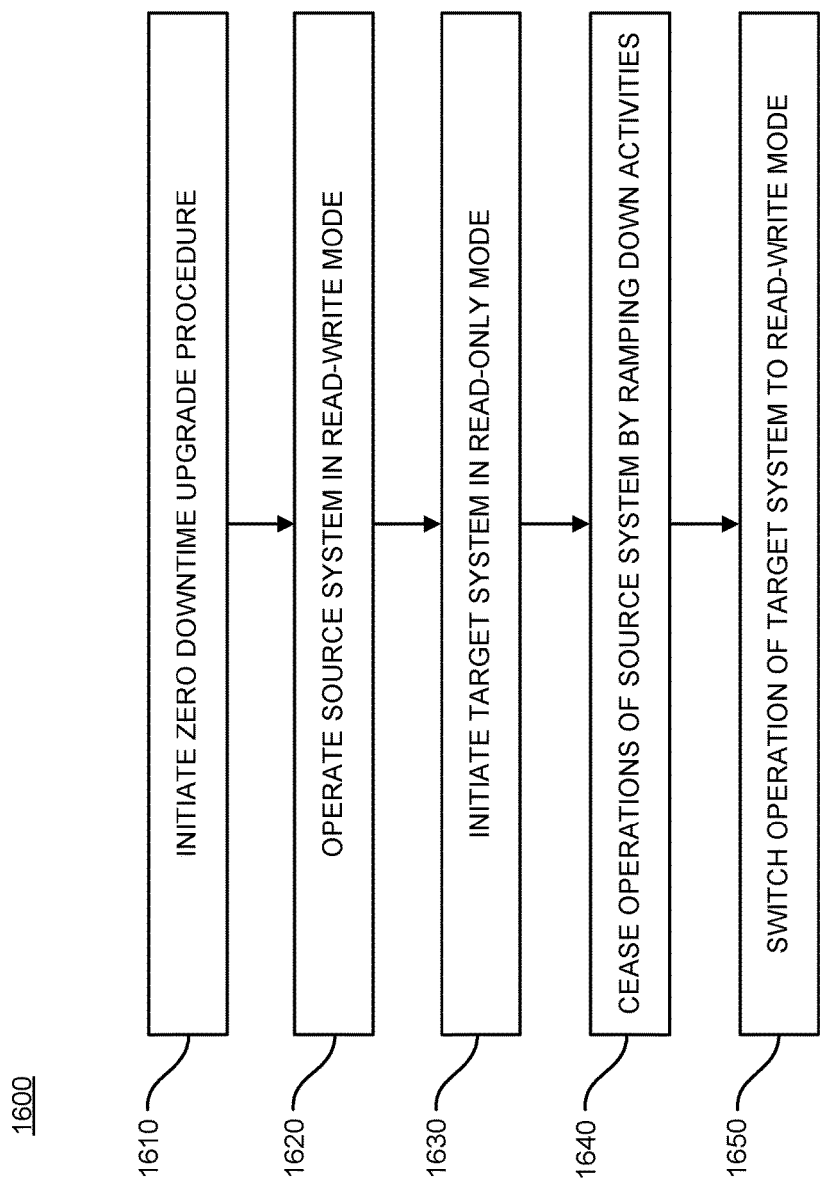
FIG. 16 is a process flow diagram illustrating switchover forming part of a zero downtime upgrade procedure.

FIG. 16 is a process flow diagram 1600 in which, at 1610, a zero downtime upgrade procedure is initiated that upgrades a first version of software executing on a source system comprising at least one source server to a second version of software executing on a target system comprises at least one target server. Thereafter, at 1620, the source system operates/continues to operate in a read-write mode. Further, at 1630, operation of the target system is initiated in a read-only mode which is concurrent with the operation of the source system. Operation of the source system is then ceased, at 1640, by ramping down activities of the source system. Subsequently, upon cessation of operation of the source system, operation of the target system is switched, at 1650, to a read-write mode.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   initiating a zero downtime upgrade procedure upgrading a first version of software executing on a source system comprising at least one source server to a second version of software executing on a target system comprising at least one target server;
   operating the source system in a read-write mode;
   initiating, concurrent with the operation of the source system in the read-write mode, operation of the target system in a read-only mode, wherein the initiating operation of the target system comprises:
      installing software for the second version on the target system;
      preventing access to the target system, wherein preventing access comprises returning an error code in response to an attempt to write or update the target system;
      configuring, after installing the second version, the target system to operate in a read-only mode; and
      starting, after the configuring, the target system in the read-only mode;
   ceasing operation of the source system by ramping down activities of the source system, wherein ramping down activities comprises:
      switching off asynchronous processing and switching on synchronous processing; and
      logging out users of the source system having an idle time above a pre-defined idle time threshold; and
   switching, upon cessation of operation of the source system, operation of the target system to a read-write mode.

2. The method of claim 1, wherein ramping down activities comprises:
   preventing batch jobs having an execution time above a pre-defined switchover threshold from executing on the source system.

3. The method of claim 1 further comprising:
   disabling login to the source system after the target system is started and opened for login.

4. The method of claim 3 further comprising:
   terminating, at the source system, any remaining batches.

5. The method of claim 4 further comprising:
   updating, after the cessation, the source system to include the second version of the software; and
   enabling the source system to operate using the second version of the software.

6. The method of claim 1 wherein the source system and the target system share a set of database tables on which both the source system and the target system can perform read-write operations.

7. The method of claim 1, further comprising testing, after the installing of the second version and before the starting of the target system in the read-only mode, the second version on the target system.

8. The method of claim 7, wherein the testing comprises providing freeze triggers configured to identify a server requesting write access to the target system.

9. A system comprising one or more processors and memory, the system further comprising:
- a source system comprising at least one source server executing a first version of software; and
- a target system comprising at least one target server executing a second version of software;

wherein:
- a zero downtime upgrade procedure is initiated that upgrades the first version of software executing on the source system to a second version of software executing on the target system;
- the source system operates in a read-write mode;
- operation of the target system in a read-only mode is initiated concurrent with the operation of the source system in the read-write mode, wherein the initiating operation of the target system comprises:
  - installing software for the second version on the target system;
  - preventing access to the target system, wherein preventing access comprises returning an error code in response to an attempt to write or update the target system;
  - configuring, after installing the second version, the target system to operate in a read-only mode; and
  - starting, after the configuring, the target system in the read-only mode;
- operation of the source system is ceased by ramping down activities of the source system, wherein ramping down activities comprises:
  - switching off asynchronous processing and switching on synchronous processing; and
  - logging out users of the source system having an idle time above a pre-defined idle time threshold; and
- operation of the target system is switched to a read-write mode upon cessation of operation of the source system.

10. The system of claim 9, wherein ramping down activities comprises:
preventing batch jobs having an execution time above a pre-defined switchover threshold from executing on the source system.

11. The system of claim 9, wherein login to the source system is disabled after the target system is started and opened for login.

12. The system of claim 11, wherein any remaining batches are terminated at the source system.

13. The system of claim 12, wherein,
after the cessation, the source system is updated to include the second version of the software to enable the source system to operate using the second version of the software.

14. The system of claim 9, wherein the source system and the target system share a set of database tables on which both the source system and the target system can perform read-write operations.

15. A non-transitory computer program product storing instructions which, when executed by at least one data processor forming part of at least one computing system, result in operations comprising:
- initiating a zero downtime upgrade procedure upgrading a first version of software executing on a source system comprising at least one source server to a second version of software executing on a target system comprising at least one target server;
- operating the source system in a read-write mode;
- initiating, concurrent with the operation of the source system in the read-write mode, operation of the target system in a read-only mode, wherein the initiating operation of the target system comprises:
  - installing software for the second version on the target system;
  - preventing access to the target system, wherein preventing access comprises returning an error code in response to an attempt to write or update the target system;
  - configuring, after installing the second version, the target system to operate in a read-only mode; and
  - starting, after the configuring, the target system in the read-only mode;
- ceasing operation of the source system by ramping down activities of the source system; and
- switching, upon cessation of operation of the source system, operation of the target system to a read-write mode;
- wherein ramping down activities comprises:
  - switching off asynchronous processing and switching on synchronous processing;
  - preventing batch jobs having an execution time above a pre-defined switchover threshold from executing on the source system; and
  - logging out users of the source system having an idle time above a pre-defined idle time threshold.

* * * * *